US009852099B2

(12) United States Patent
Iwasaki et al.

(10) Patent No.: US 9,852,099 B2
(45) Date of Patent: Dec. 26, 2017

(54) SLAVE COMMUNICATION DEVICE AND BUS COMMUNICATION SYSTEM

(71) Applicant: DENSO CORPORATION, Kariya, Aichi-pref. (JP)

(72) Inventors: Toshiaki Iwasaki, Nagoya (JP); Susumu Tsuruta, Okazaki (JP); Kouichi Maeda, Anjo (JP)

(73) Assignee: DENSO CORPORATION, Kariya (JP)

( * ) Notice: Subject to any disclaimer, the term of this patent is extended or adjusted under 35 U.S.C. 154(b) by 238 days.

(21) Appl. No.: 14/711,825

(22) Filed: May 14, 2015

(65) Prior Publication Data

US 2015/0331819 A1    Nov. 19, 2015

(30) Foreign Application Priority Data

May 16, 2014   (JP) .................................. 2014-102308

(51) Int. Cl.
*G06F 13/40* (2006.01)
*G06F 1/32* (2006.01)
*G06F 13/42* (2006.01)

(52) U.S. Cl.
CPC ........ *G06F 13/4072* (2013.01); *G06F 1/3296* (2013.01); *G06F 13/4295* (2013.01)

(58) Field of Classification Search
CPC ..................... G06T 5/002; G06T 5/005; G06T 2207/20182; G06K 9/40; G06F 1/3296; G06F 13/4072; G06F 13/4295

USPC ......................... 348/241–251; 382/274, 275
See application file for complete search history.

(56) References Cited

U.S. PATENT DOCUMENTS

| | | | |
|---|---|---|---|
| 6,693,678 B1 | 2/2004 | Tulta et al. | |
| 2001/0023468 A1* | 9/2001 | Oh ...................... | G06F 13/4291 710/305 |
| 2003/0201789 A1* | 10/2003 | Tillema ............... | H04L 25/0298 326/30 |
| 2010/0004828 A1* | 1/2010 | Lance ...................... | H04L 7/06 701/46 |
| 2012/0133352 A1* | 5/2012 | Frank ..................... | G06F 1/324 323/318 |
| 2014/0036988 A1 | 2/2014 | Kashima et al. | |

FOREIGN PATENT DOCUMENTS

| | | |
|---|---|---|
| JP | S60-117843 A | 6/1985 |
| JP | 07-046104 A | 2/1995 |
| JP | H08-265859 A | 10/1996 |
| JP | 2015-204484 A | 11/2015 |

* cited by examiner

*Primary Examiner* — Tim T Vo
*Assistant Examiner* — Herve Iradukunda
(74) *Attorney, Agent, or Firm* — Posz Law Group, PLC

(57) ABSTRACT

A slave communication device is connected to a master communication device through a single bus, and transmits a data signal according to a synchronization signal transmitted from the master communication device. The slave communication device includes a current reduction unit that reduces a current flowing into the bus from the slave communication device at least in a period where the synchronization signal is transmitted from the master communication device.

15 Claims, 13 Drawing Sheets

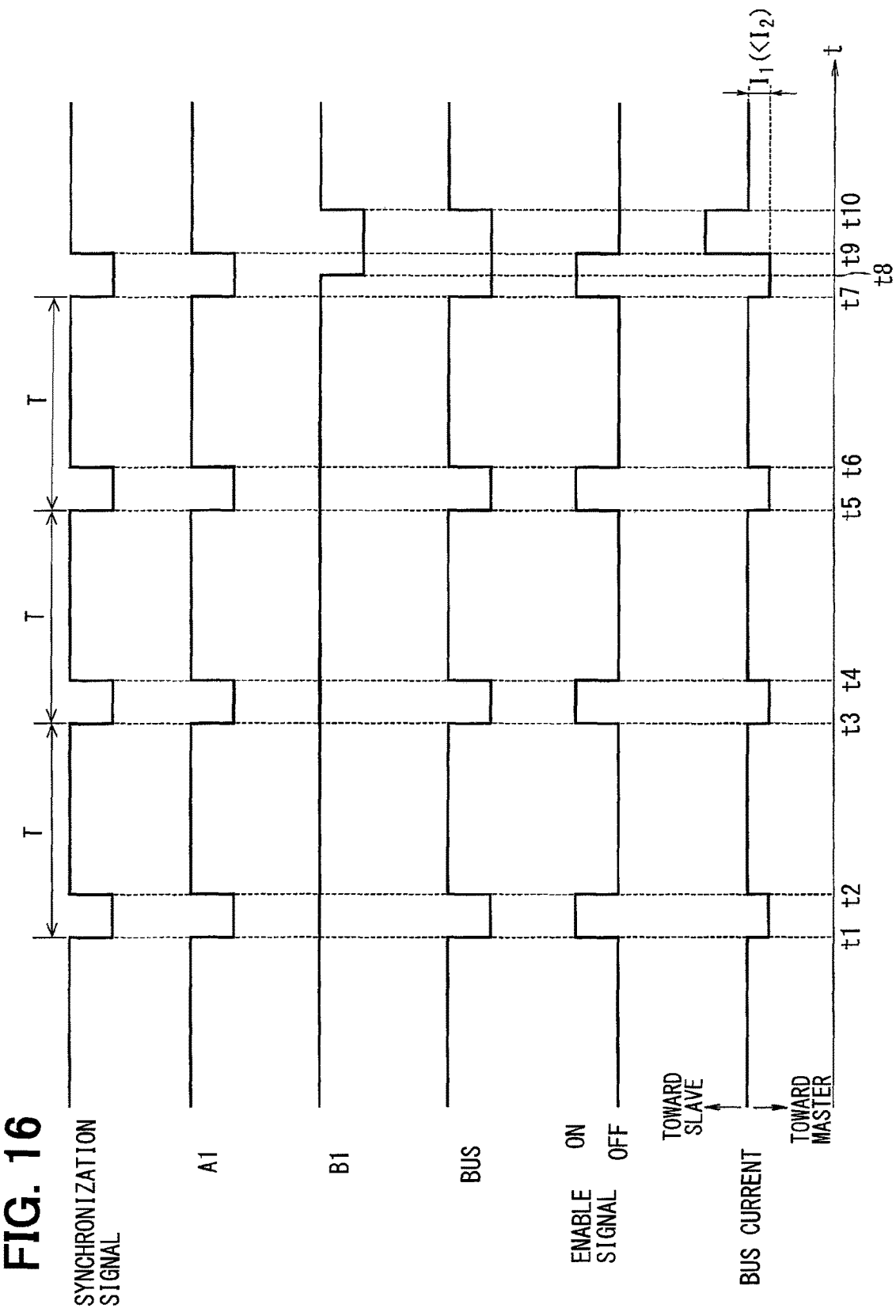

SLAVE COMMUNICATION DEVICE AND BUS COMMUNICATION SYSTEM

CROSS REFERENCE TO RELATED APPLICATION

This application is based on Japanese Patent Application No. 2014-102308 filed on May 16, 2014, the disclosure of which is incorporated herein by reference.

TECHNICAL FIELD

The present disclosure relates to a slave communication device connected to a master communication device through a single bus, and a bus communication system in which a slave communication device and a master communication device are connected to each other through a single bus.

BACKGROUND

A bus communication system in which a master communication device and a slave communication device are connected to each other through a single bus (data transmission line) has been proposed, for example, in JP H60-117843 A.

SUMMARY

In such a bus communication system, in a structure where the slave communication device transmits a data signal according to a synchronization signal transmitted from the master communication device, a current flows into the bus from the slave communication device in a period where the synchronization signal is transmitted from the master communication device. In such a case, when the current flowing into the bus is increased, a current change of the signal on the bus is increased. As a result, a noise is superimposed on the signal on the bus.

It is an object of the present disclosure to provide a slave communication device and a bus communication system, which are capable of reducing a noise superimposed on a signal on a bus in a period where a synchronization signal is transmitted from a master communication device.

According to an aspect of the present disclosure, a slave communication device is connected to a master communication device through a single bus. The slave communication device transmits a data signal according to a synchronization signal transmitted from the master communication device. The slave communication device includes a current reduction unit that reduces a current flowing into the bus in a period where at least the synchronization signal is transmitted from the master communication device.

In the above structure, since the current flowing into the bus from the slave communication device in the period where the synchronization signal is transmitted from the master communication device is restricted, the current change of the signal on the bus is restricted. As such, a noise superimposed on the signal on the bus is reduced.

According to a second aspect of the present disclosure, a bus communication system includes the slave communication device having the above structure and a master communication device.

In the bus communication device, since the slave communication device has the current reduction unit, the current change of the signal on the bus is restricted, and a noise superimposed on the signal on the bus is reduced.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which:

FIG. 16 is a diagram illustrating a time chart of an operation of a bus communication system according to a fifth embodiment of the present disclosure.

DETAILED DESCRIPTION

First Embodiment

Figure 1:
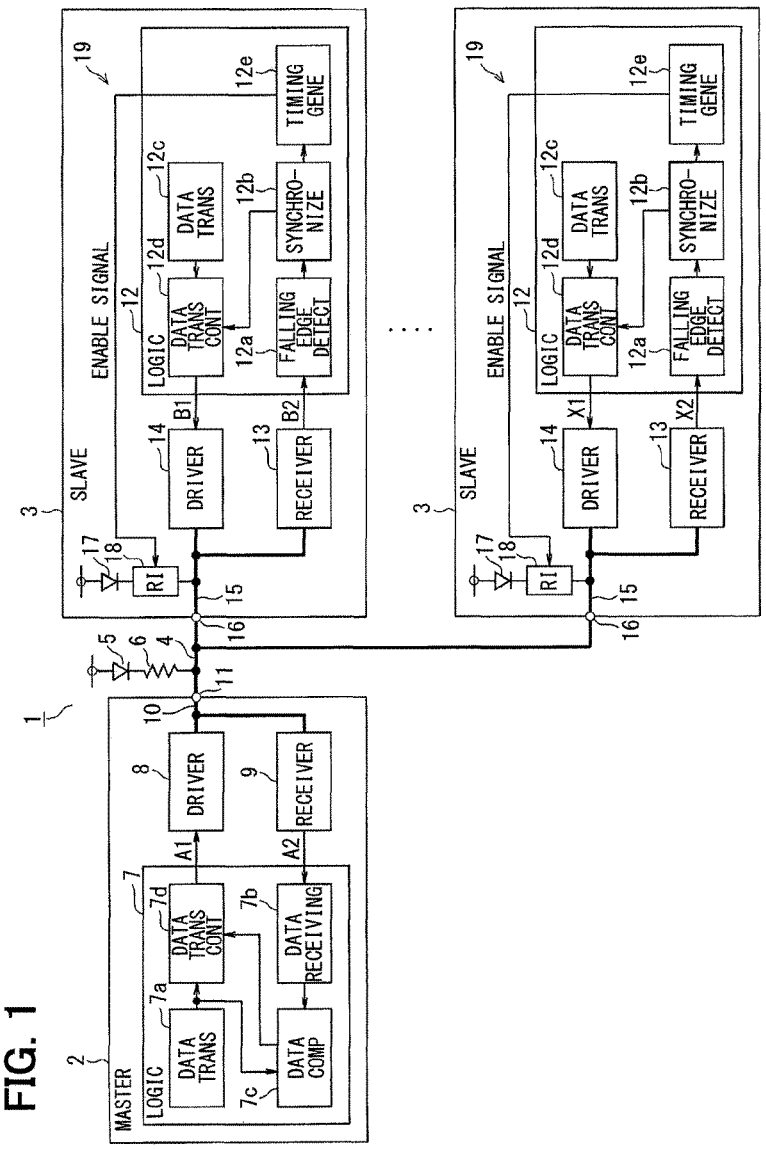
FIG. 1 is a functional block diagram illustrating a bus communication system according to a first embodiment of the present disclosure.

Hereinafter, a first embodiment of the present disclosure will be described with reference to FIGS. 1 to 8.

In a bus communication system 1 of the first embodiment, a master communication device 2 and a plurality of slave communication devices 3 are connected to each other through a single bus (data transmission line) 4. A diode 5 and a pull-up resistor 6 are connected in series between a power supply voltage (Vdd) and the bus 4. Because the bus 4 is connected to a power supply voltage side in a pull-up manner by the pull-up resistor 6, a voltage at a high level or a low level is applied to the master communication device 2 and the slave communication devices 3.

If a voltage at an intermediate level between the high level and the low level is applied to the master communication device 2 or the slave communication devices 3, an internal state will be unstable or a malfunction will occur. If a voltage lower than the low level or a voltage higher than the high level is applied to the master communication device 2 or the slave communication devices 3, a current out of a design flows, and will cause damage such as breakage of a circuit.

In the present embodiment, the bus 4 is connected to the power supply voltage side in the pull-up manner by the pull-up resistor 6 to avoid an occurrence of such a problem, thereby to stabilize an operation of the entirety of the system. For example, the master communication device 2 and the plurality of the slave communication devices 3 are provided by integrated circuits (ICs).

The master communication device 2 includes a logic circuit 7, a driver circuit 8 and a receiver circuit 9. The driver circuit 8 and the receiver circuit 9 are connected to a bus connection terminal 11 through a bus connection line 10 inside of the master communication device 2. The bus connection line 10 and the bus 4 are connected to each other through the bus connection terminal 11 to enable signal transmission and reception between the master communication device 2 and the bus 4, that is, to enable driving of the bus 4.

The logic circuit 7 includes a data transmitting circuit 7a, a data receiving circuit 7b, a data comparison circuit 7c, and a data transmission control circuit 7d. The data transmitting circuit 7a generates a transmission data (bit string), and outputs the transmission data to the data comparison circuit 7c and the data transmission control circuit 7d. The data transmitting circuit 7a may directly output a transmission data received from an external device to the data comparison circuit 7c and the data transmission control circuit 7d.

The data receiving circuit 7b receives a reception data by a signal from the receiver circuit 9 (i.e., signal on the bus 4) (A2), and outputs the reception data to the data comparison circuit 7c. The data comparison circuit 7c receives the transmission data from the data transmitting circuit 7a and the reception data from the data receiving circuit 7b. The data comparison circuit 7c compares the transmission data and the reception data, and outputs a control command according to the result of comparison to the data transmission control circuit 7d.

The data transmission control circuit 7d controls (permits or prohibits) output of the transmission data (A1) received from the data transmitting circuit 7a to the driver circuit 8 based on the control command outputted from the data comparison circuit 7c.

The driver circuit 8 is an open-drain output circuit or an open-collector output circuit. A drain terminal or a collector terminal of the driver circuit 8 is connected to the bus 4. Note that the logic circuit 7 may be substituted by a microcomputer or the like in the master communication device 2.

The slave communication device 3 includes a logic circuit 12, a receiver circuit 13, and a driver circuit 14. The receiver circuit 13 and the driver circuit 14 are connected to a bus connection terminal 16 through a bus connection line 15 inside of the slave communication device 3. The bus connection line 15 and the bus 4 are connected to each other through the bus connection terminal 16 to enable signal transmission and reception between the slave communication device 3 and the bus 4, that is, to enable driving of the bus 4.

Figure 2:
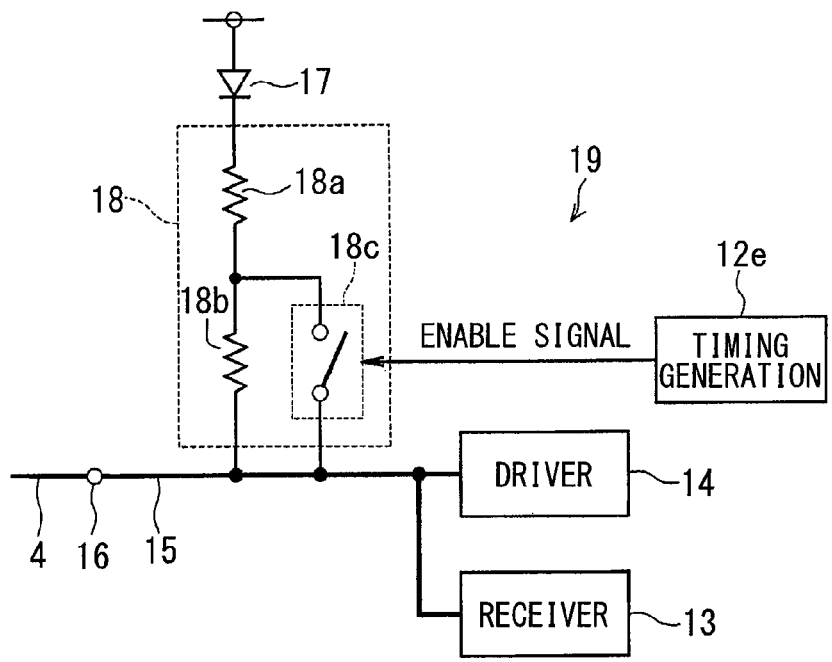
FIG. 2 is a schematic block diagram illustrating a first example of a resistance increase circuit of a slave communication device according to the first embodiment.

A diode 17 and a resistance increase circuit (RI) 18 are connected in series, between the power supply voltage and the bus connection line 15. As shown in FIG. 2, the resistance increase circuit 18 includes pull-up resistors 18a and 18b for stabilizing an operation of the slave communication device 3.

The logic circuit 12 includes a falling edge detection circuit 12a, a synchronization circuit 12b, a data transmitting circuit 12c, a data transmission control circuit 12d and a timing generation circuit 12e. When the falling edge detection circuit 12a detects the falling edge of the signal (i.e., signal on the bus 4) received from the receiver circuit 13 (B2, X2), the falling edge detection circuit 12a outputs the detection of the falling edge to the synchronization circuit 12b.

When the synchronization circuit 12b receives the detection of the falling edge from the falling edge detection circuit 12a, the synchronization circuit 12b establishes synchronization at a timing (time point) of the falling edge, and generates a synchronization timing. The synchronization circuit 12b outputs the synchronization timing to the data transmission control circuit 12 and the timing generation circuit 12e.

The data transmitting circuit 12c generates a transmission data (bit string), and transmits the transmission data to the data transmission control circuit 12d. Note that the data transmitting circuit 12 may directly transmit a transmission data received from an external device to the data transmission control circuit 12d, similarly to the data transmitting circuit 7a of the master communication device 2.

The data transmission control circuit 12d controls output of the transmission data received from the data transmitting circuit 12c to the driver circuit 14 (B1, X1), based on the synchronization timing received from the synchronization circuit 12b.

When the timing generation circuit 12e receives the synchronization timing from the synchronization circuit 12b, the timing generation circuit 12e switches an enable signal outputted to the resistance increase circuit 18 from off ("0") to on ("1"). When a predetermined period elapses, that is, when a predetermined clock number is counted after the switching of the enable signal from off to on, the timing generation circuit 12e switches the enable signal from on to off, that is, returns the enable signal.

The driver circuit 14 is an open-drain output circuit or an open-collector output circuit. A drain terminal or a collector terminal of the driver circuit 14 is connected to the bus 4. Note that the logic circuit 12 may be substituted for a microcomputer or the like, also in the slave communication device 3.

In the resistance increase circuit 18, as shown in FIG. 2, the pull-up resistors 18a and 18b are connected in series, and the switch circuit 18c is connected in parallel with the pull-up resistor 18b. The switch circuit 18c is in an on state (closed state, connected state) when the enable signal received from the timing generation circuit 12e is off. The switch circuit 18b is in an off state (open state, disconnected state) when the enable signal is on.

That is, the resistance increase circuit 18 has a characteristic that, when the enable signal is on, the resistance value of the resistance increase circuit 18 is higher than that when the enable signal is off, so that the current from the power supply voltage hardly flows into the bus connection line 15.

The timing generation circuit 12e and the resistance increase circuit 18 constitute a current reduction unit 19.

The structure of the resistance increase circuit 18 is not limited to the circuit structure shown in FIG. 2. The resistance increase circuit 18 may have any circuit structure as long as the resistance increase circuit 18 has the characteristic of restricting the current from the power supply voltage from flowing into the bus connection line 15 when the enable signal is on than when the enable signal is off.

Figure 3:
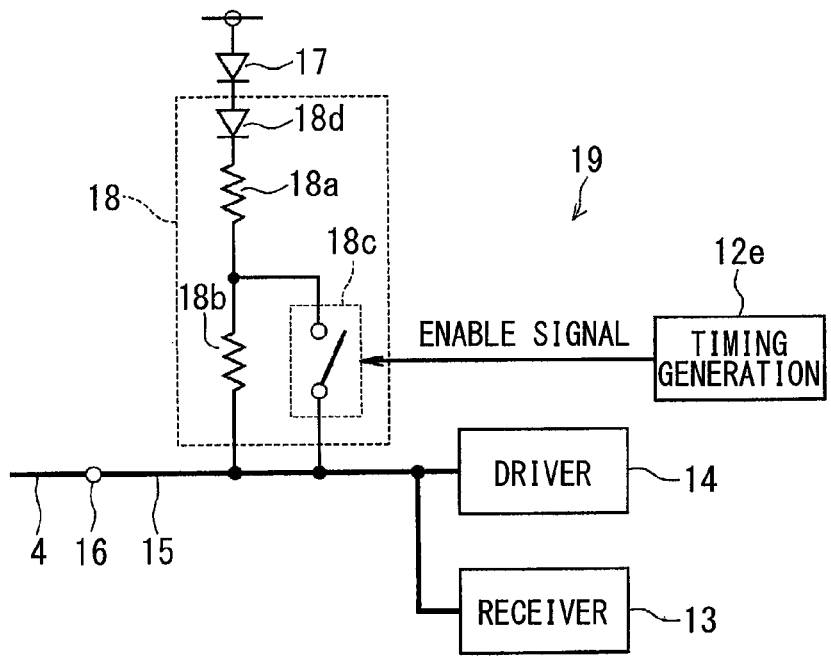
FIG. 3 is a schematic block diagram illustrating a second example of the resistance increase circuit of the slave communication device according to the first embodiment.

For example, as shown in FIG. 3, the resistance increase circuit 18 may have a circuit structure including a diode 18d in addition to the circuit structure shown in FIG. 2. Since the circuit structure shown in FIG. 3 has the diode 18d, a potential difference between both ends of the pull-up resistors 18a and 18b is smaller than the potential difference between both ends of the pull-up resistors 18a and 18b of the circuit structure shown in FIG. 2.

Figure 4:
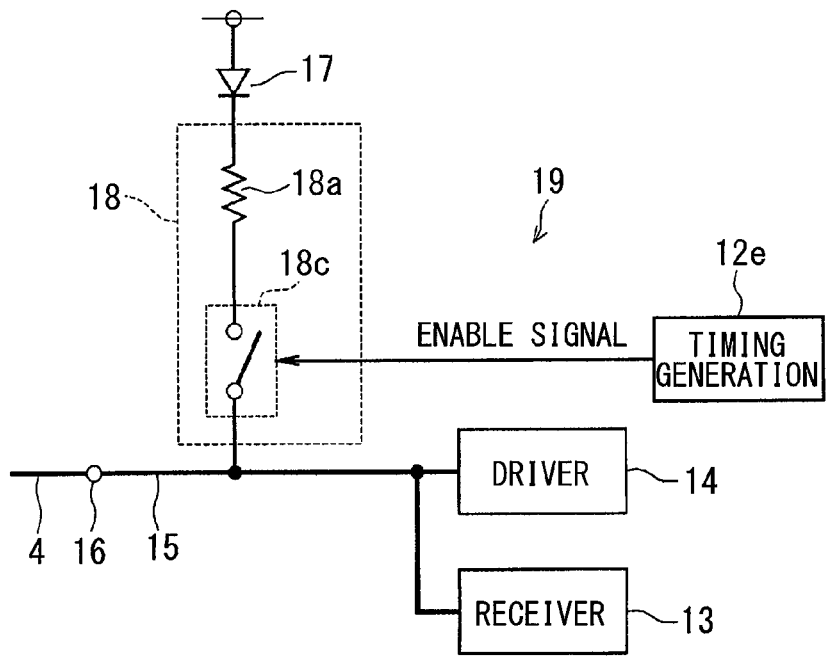
FIG. 4 is a schematic block diagram illustrating a third example of the resistance increase circuit of the slave communication device according to the first embodiment.

As another example, as shown in FIG. 4, the resistance increase circuit 18 may have a circuit structure having the pull-up resistor 18a and a switch circuit 18c only. In the circuit structure shown in FIG. 4, when the enable signal is on, the current from the power supply voltage does not flow into the bus connection line 15.

Figure 5:
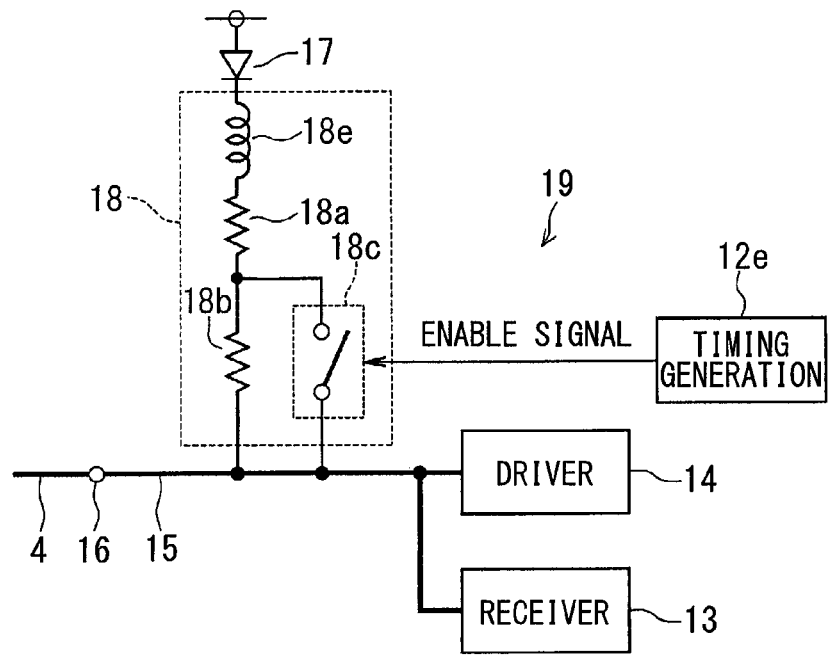
FIG. 5 is a schematic block diagram illustrating a fourth example of the resistance increase circuit of the slave communication device according to the first embodiment.

As further another example, as shown in FIG. 5, the resistance increase circuit 18 may have a circuit structure having a coil 18e in addition to the circuit structure shown in FIG. 2.

Next, an operation of the structure described above will be described with reference to FIG. 6.

The master communication device 2 transmits the synchronization signal from the driver circuit 8 intermittently at a predetermined transmission interval T. When the master communication device 2 begins the transmission of the synchronization signal, the signal on the bus 4 changes from the high level to the low level (e.g., t1, t3, t5 and t7 in FIG. 6). The slave communication device 3 detects the change of the signal on the bus 4 from the high level to the low level, and receives the synchronization signal transmitted from the master communication device 2 by the receiver circuit 13.

In the slave communication device 3, when the receiver circuit 13 receives the synchronization signal, the falling edge detection circuit 12a detects the falling edge of the synchronization signal. The synchronization circuit 12b establishes the synchronization at the timing of the falling edge, and generates the synchronization timing.

When there is a data signal to be transmitted to the master communication device 2 at the timing where the synchronization timing is generated, the driver circuit 14 transmits the data signal according to the synchronization signal following the synchronization timing generated. In other words, the driver circuit 14 transmits the data signal by temporally overlapping with the period where the synchronization signal is transmitted. For example, the driver circuit 14 begins to transmit the data signal in the period where the synchronization signal is transmitted.

Figure 6:
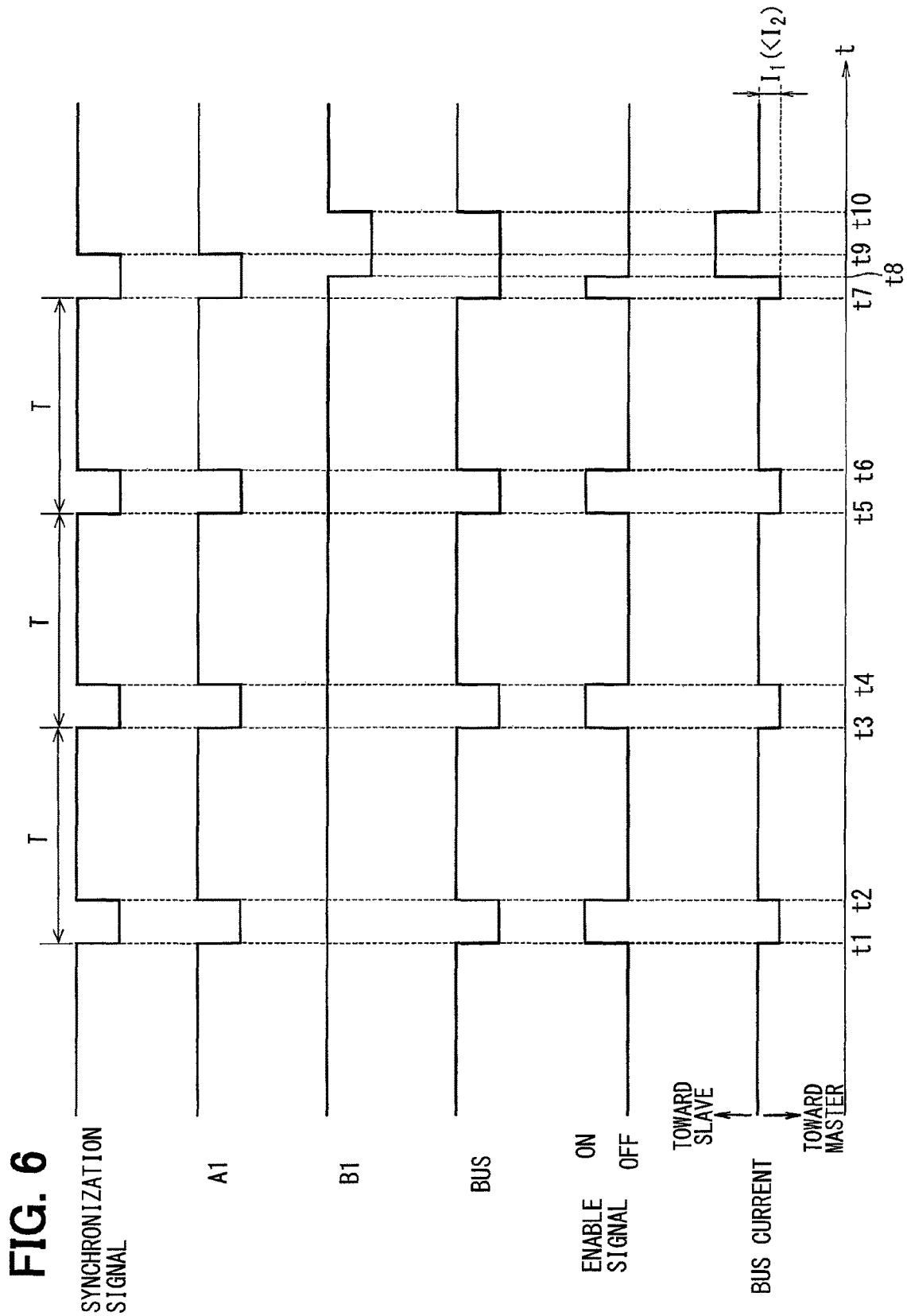
FIG. 6 is a diagram illustrating a time chart of an operation of the bus communication system according to the first embodiment.

When the master communication device 2 stops the transmission of the synchronization signal, and when the slave communication device 3 is not transmitting the data signal, the signal on the bus 4 changes from the low level to the high level at the time the transmission of the synchronization signal is stopped (t2, t4, and t6 in FIG. 6). On the other hand, when the slave communication device 3 is transmitting the data signal according to the synchronization signal (t8 in FIG. 6), the signal on the bus 4 changes from the low level to the high level at the time the transmission of the data signal is stopped (t10 in FIG. 6).

In a period where the synchronization signal is transmitted from the master communication device 2 and the data signal is not transmitted from the slave communication device 3 (t1 to t2, t3 to t4, t5 to t6, t7 to t8 in FIG. 6), since the signal on the bus 4 is at the low level, the current flows into the bus 4 from the slave communication device 3.

In this case, when the current flowing into the bus 4 from the slave communication device 3 is increased, the change in current of the signal on the bus 4 is increased. As a result, a noise is superimposed on the signal on the bus 4. Considering this issue, in the present embodiment, the slave communication device 3 performs the following operation.

When the synchronization timing is generated, the slave communication device 3 changes the enable signal outputted from the timing control circuit 12e from off to on to increase the resistance value of the resistance increase circuit 18. Since the resistance value of the resistance increase circuit 18 is increased, the current flowing from the power supply voltage into the bus connection line 15 is restricted, and hence the current flowing into the bus 4 from the slave communication device 3 is restricted.

Figure 7:
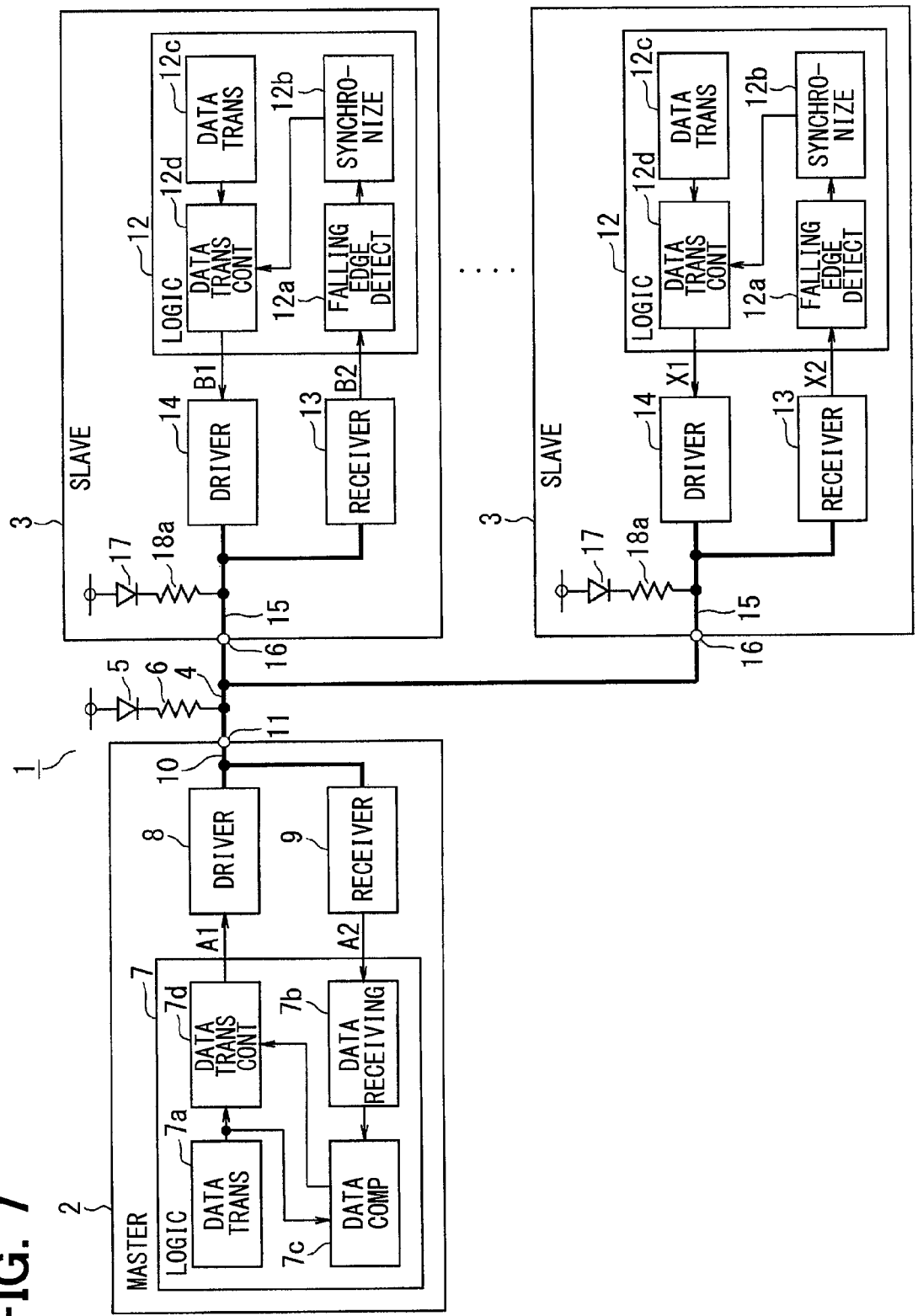
FIG. 7 is a functional block diagram illustrating a bus communication system as a comparative example to the first embodiment.
Figure 8:
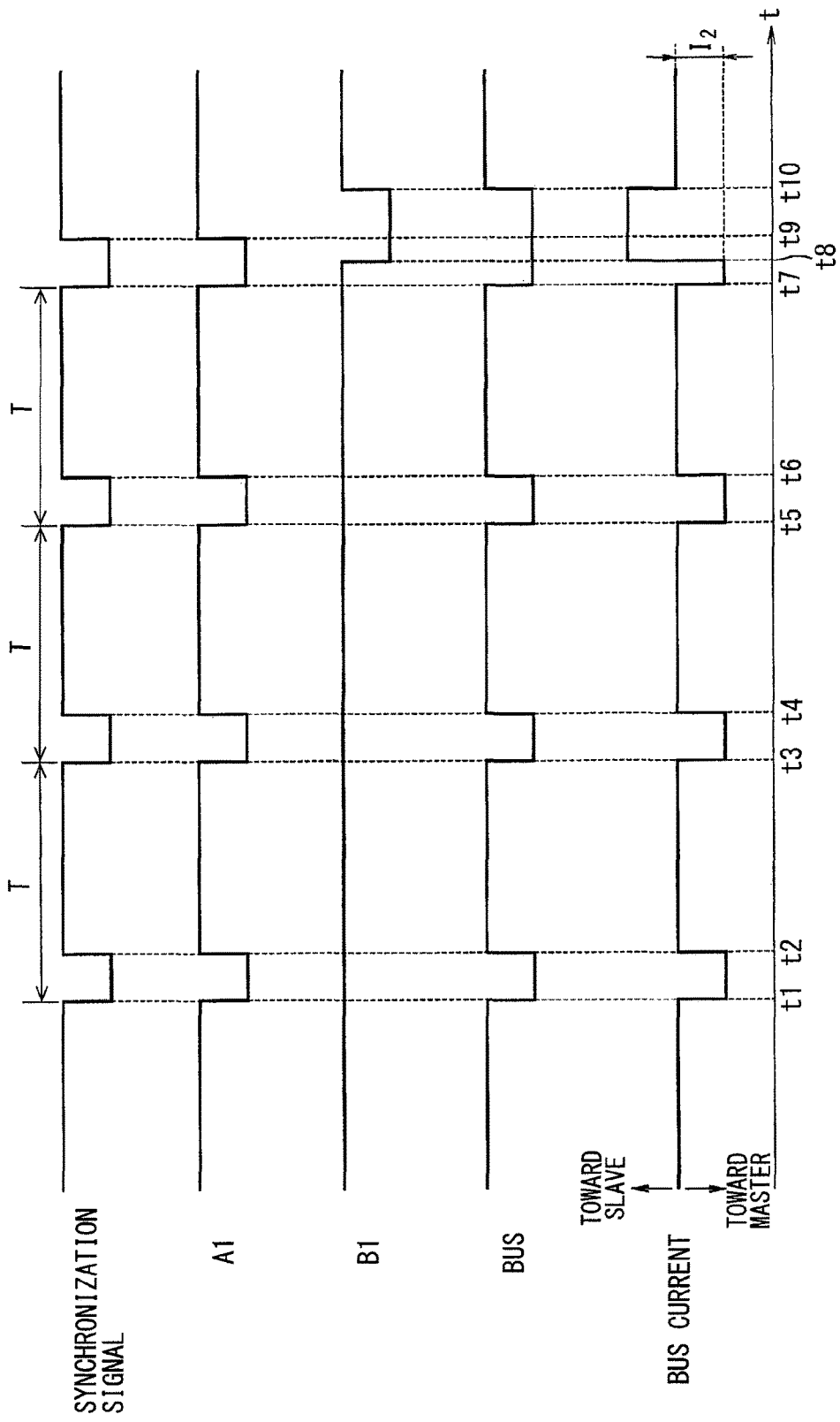
FIG. 8 is a diagram illustrating a time chart of an operation of the bus communication system of the comparative example.
Figure 9:
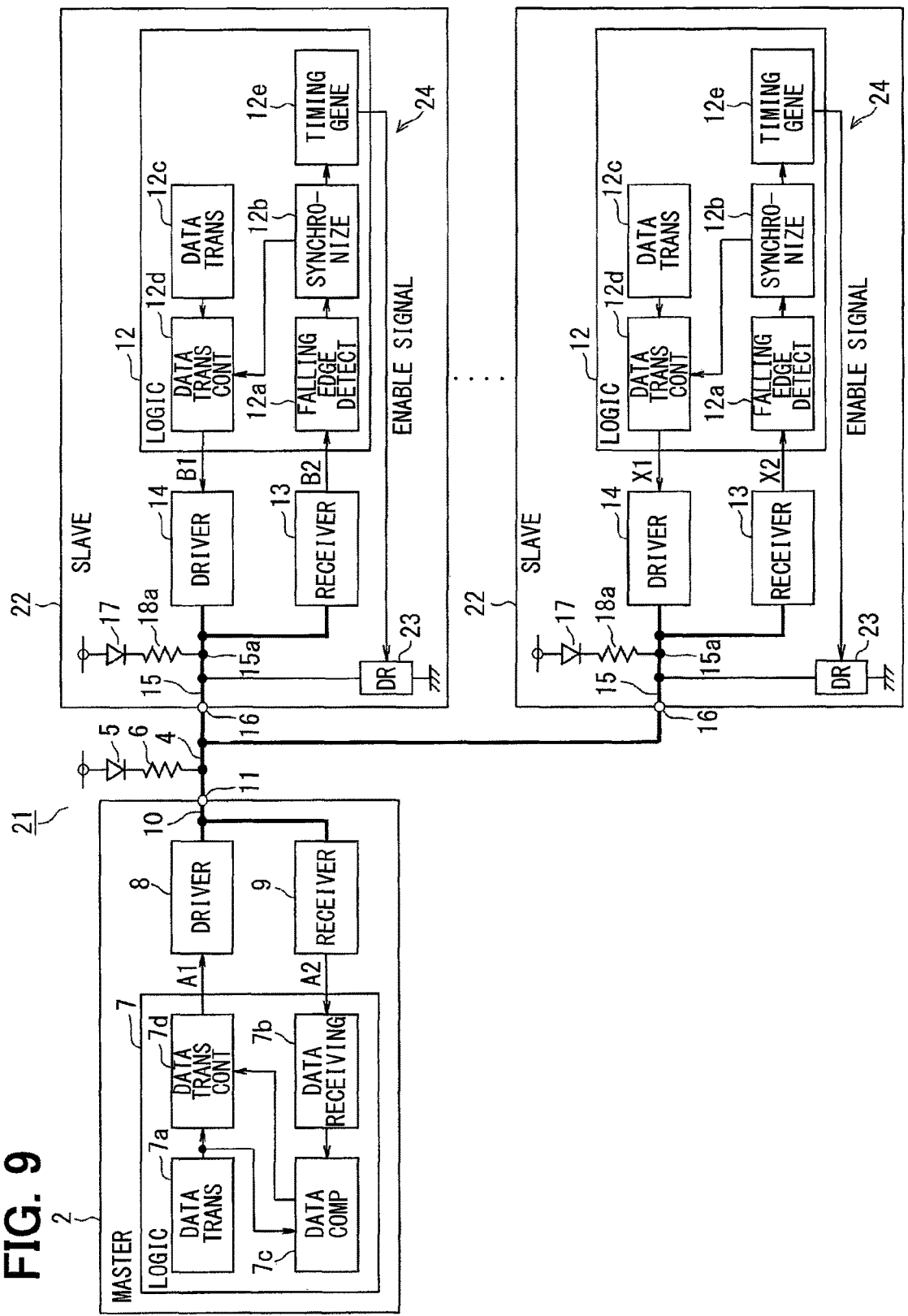
FIG. 9 is a functional block diagram illustrating a bus communication system according to a second embodiment of the present disclosure.

FIGS. 7 and 8 are diagrams illustrating a comparative example to the present embodiment. In the structure shown in FIGS. 7 and 8, the diode 17 and the pull-up resistor 18a are simply connected in series between the power supply voltage and the bus connection line 15, and the slave communication device 3 does not have the timing generation circuit 12e.

In the present embodiment, on the other hand, the slave communication device 3 has the timing generation circuit 12e. The operation of the resistance increase circuit 18 is changed according to the enable signal so that, in the period where the synchronization signal is transmitted and the data signal is not transmitted, the current from the power supply voltage hardly flows into the bus connection line 15. As a result, the current flowing into the bus connection line 15 from the power supply voltage can be restricted, as compared with the structure of the comparative example. Accordingly, the current flowing into the bus 4 from the slave communication device 3 can be restricted (I1<I2).

In the slave communication device 3, when the driver circuit 14 transmits the data signal by superimposing on the synchronization signal, the enable signal is changed from on to off even before a predetermined period elapses after the time the enable signal is changed from off to on, thereby to return the resistance value of the resistance increase circuit 18.

As described above, in the present embodiment, the slave communication device 3 has the timing generation circuit 12e and the resistance increase circuit 18. The operation of the resistance increase circuit 18 is changed by the enable signal so that, in the period where the synchronization signal is transmitted and the data signal is not transmitted, the current from the power supply voltage hardly flows into the bus connection line 15.

Therefore, in the period where the synchronization signal is transmitted and the data signal is not transmitted, the current flowing into the bus connection line 15 from the power supply voltage can be restricted, and hence the current flowing into the bus 4 from the slave communication device 3 can be restricted. As a result, a noise superimposed on the signal on the bus 4 can be reduced.

In the first embodiment, the period where the synchronization signal is transmitted is specified by the synchronization circuit 12b that is for controlling a transmission timing of the data signal. Since the synchronization circuit 12b is effectively used, it is not necessary to additionally employ a circuit for specifying the period where the synchronization signal is transmitted. As such, an increase in circuit size of the whole device is restricted.

Second Embodiment

Next, a second embodiment of the present disclosure will be described with reference to FIGS. 9 to 12. Hereinafter, descriptions of the parts same as those of the first embodiment will not be repeated, and different parts will be mainly described.

In the second embodiment, a bus communication system 21 is configured in such a manner that the master communication device 2 and a plurality of slave communication devices 22 are connected to each other through the single bus 4. In the slave communication device 22, the diode 17 and the pull-up resistor 18a are connected in series between the power supply voltage and the bus connection line 15. A section of the bus connection line 15 between the connection point 15a with the pull-up resistor 18a and the connection terminal 16 is connected to the ground through a current drawing circuit (DR) 23.

Figure 10:
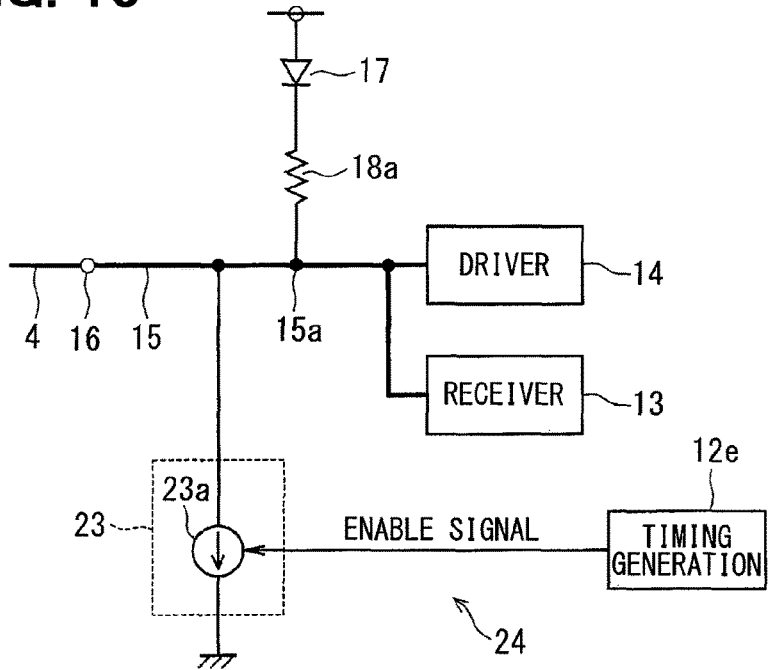
FIG. 10 is a schematic block diagram illustrating a first example of a current drawing circuit of a slave communication device according to the second embodiment.

As shown in FIG. 10, the current drawing circuit 23 includes a constant current circuit 23a. The constant current circuit 23a is activated when the enable signal outputted from the timing generation circuit 12e is on. The constant current circuit 23a is deactivated when the enable signal is off. The current drawing circuit 23 has a characteristic of drawing the current that flowed in the bus connection line 15 from the power supply voltage toward the ground, when the enable signal is on. In other words, the current drawing circuit 23 has a characteristic of allowing the current that flowed in the bus connection line 15 from the power supply voltage to more easily flow toward the ground when the enable signal is on than when the enable signal is off. The timing generation circuit 12e and the current drawing circuit 23 constitute a current reduction unit 24.

The structure of the current drawing circuit 23 is not limited to the circuit structure shown in FIG. 10. The current drawing circuit 23 may have any circuit structure as long as the current drawing circuit 23 has the characteristic of drawing the current that flowed in the bus connection line 15 from the power supply voltage toward the ground when the enable signal is on than when the enable signal is off.

Figure 11:
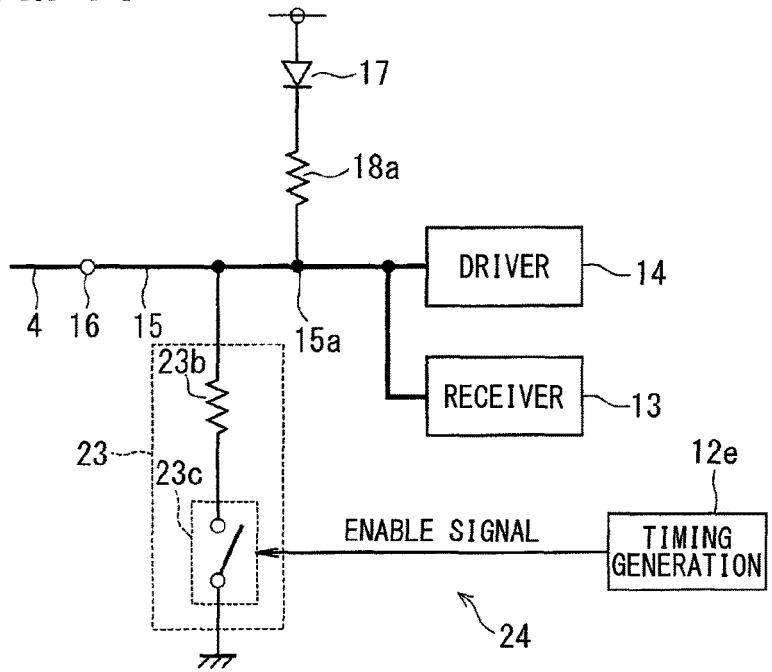
FIG. 11 is a schematic block diagram illustrating a second example of the current drawing circuit of the slave communication device according to the second embodiment.

For example, as shown in FIG. 11, the current drawing circuit 23 may have a structure in which a pull-down resistor 23b and a switch circuit 23c are connected in series. The switch circuit 23c is in an off state (open state, disconnected state) when the enable signal outputted from the timing generation circuit 12e is off. The switch circuit 23c is in an on state (closed state, connected state) when the enable signal is on.

Figure 12:
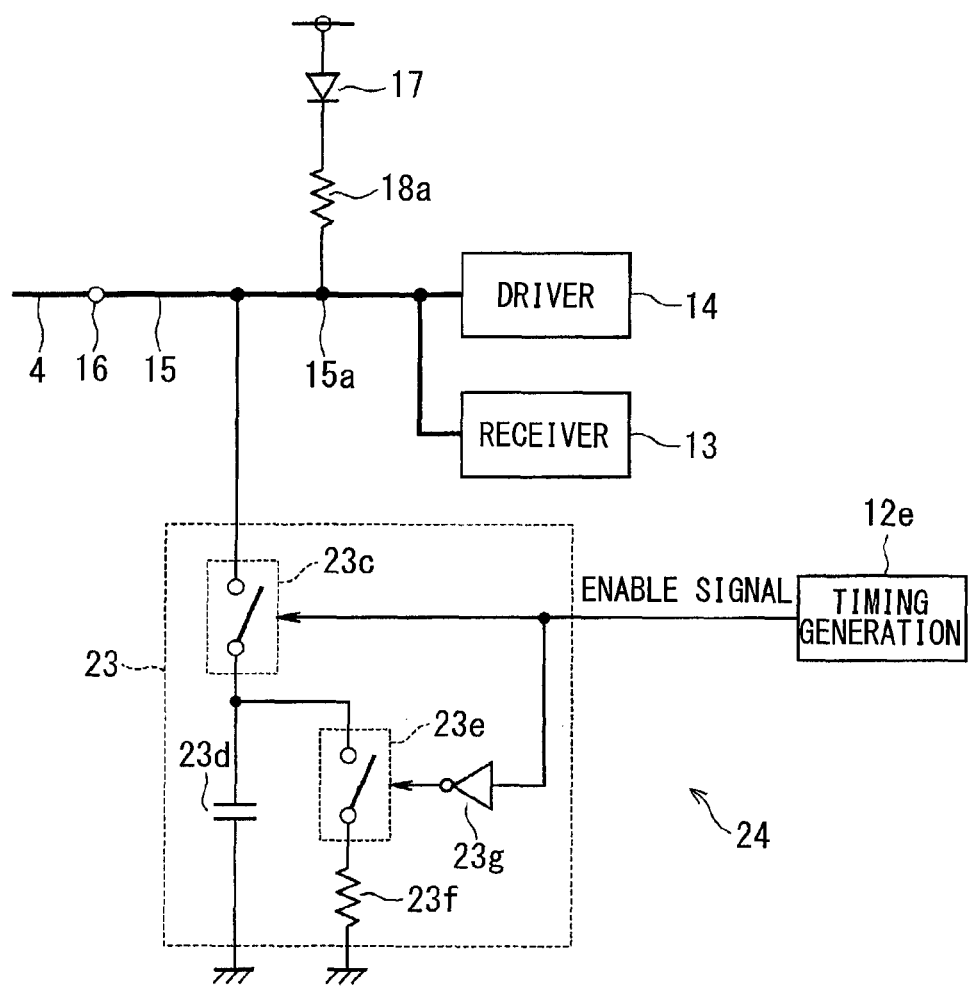
FIG. 12 is a schematic block diagram illustrating a third example of the current drawing circuit of the slave communication device according to the second embodiment.

As another example, the current drawing circuit 23 may have a structure as shown in FIG. 12. In the current drawing circuit 23 shown in FIG. 12, the switch circuit 23c and a capacitor 23d are connected in series, and an intermediate connection point between the switch circuit 23c and the capacitor 23d is connected to the ground through a switch circuit 23e and a resistor 23f. The enable signal is inputted to the switch circuit 23e through a not type logic circuit 23g. The switch circuit 23e is in an on state (closed state, connected state) when the enable signal from the timing generation circuit 12e is off. The switch circuit 23e is in an off state (open state, disconnected state) when the enable signal is on.

As described above, in the second embodiment, the slave communication device 22 is provided with the timing generation circuit 12e and the current drawing circuit 23. The operation of the current drawing circuit 23 is changed by the enable signal so that, in the period where the synchronization signal is transmitted and the data signal is not transmitted, the current flowing in the bus connection line 15 from the power supply voltage is drawn to the ground.

Therefore, in the period where the synchronization signal is transmitted and the data signal is not transmitted, the current flowing in the bus connection line 15 from the power supply voltage can be drawn to the ground. As a result, similarly to the first embodiment, the current flowing into the bus 4 from the slave communication device 22 can be restricted, and a noise superimposed on the signal on the bus 4 can be reduced.

In the first embodiment, the circuit structure on a periphery of the pull-up resistor 18a is reformed. In the second embodiment, differently from the first embodiment, the circuit structure on the periphery of the pull-up resistor 18a is not reformed. Therefore, the second embodiment can be applied even if there is restriction of the pull-up resistor 18a or the peripheral circuit structure due to the standard of the IC or the like.

In the case where the current drawing circuit 23 is configured to include the pull-down resistor 23b or the capacitor 23d, a rapid current change will occur immediately after the enable signal is turned on. In the structure where the current drawing circuit 23 is configured to include the constant current circuit 23a, the occurrence of the rapid current change can be avoided.

Third Embodiment

Figure 13:
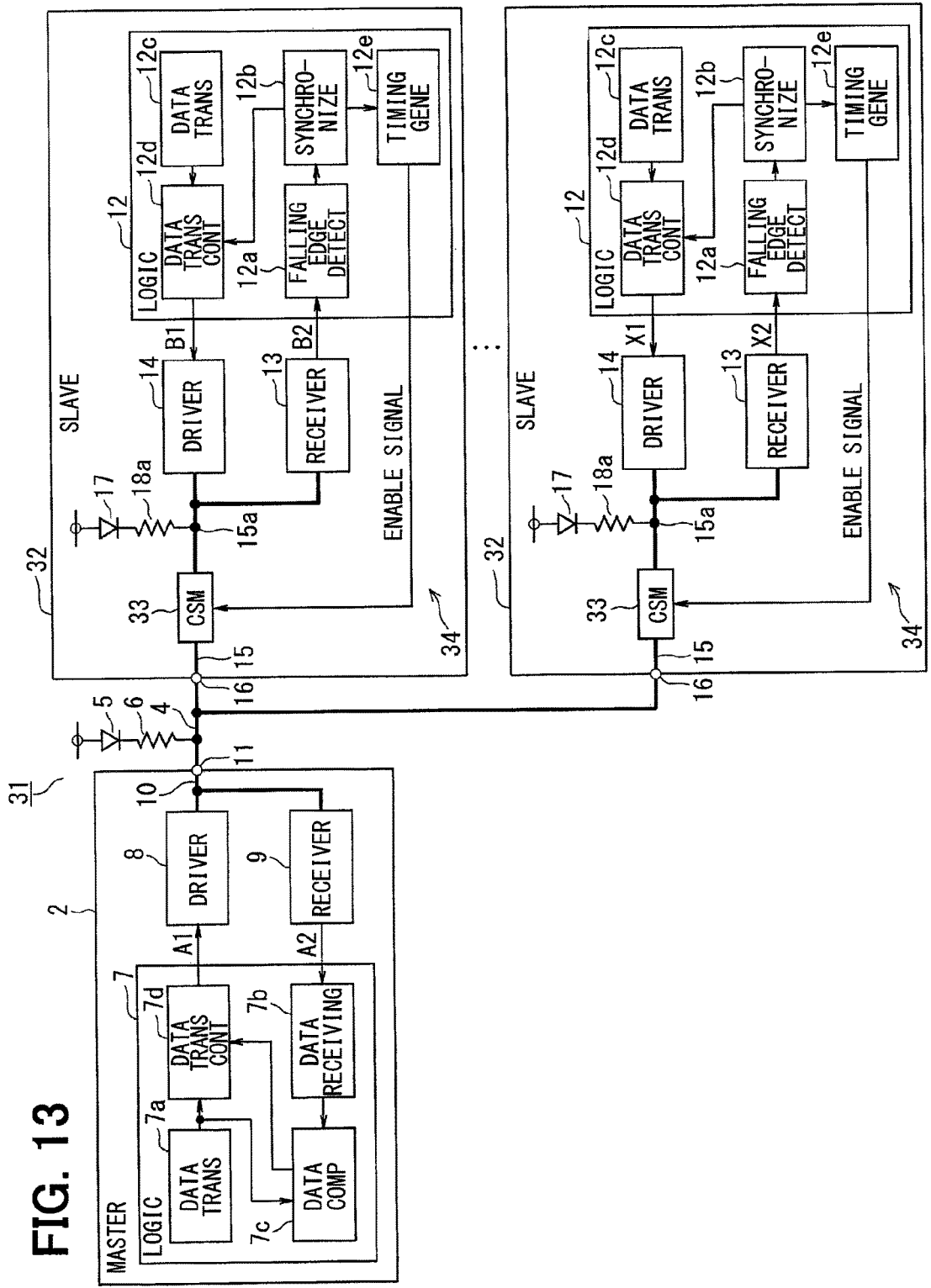
FIG. 13 is a functional block diagram illustrating a bus communication system according to a third embodiment of the present disclosure.

Next, a third embodiment of the present disclosure will be described with reference to FIG. 13 and FIG. 14. Hereinafter, descriptions of the parts same as those of the first embodiment will not be repeated, and different parts will be mainly described.

In the third embodiment, a bus communication system 31 is configured in such a manner that the master communication device 2 and a plurality of slave communication device 32 are connected to each other through a single bus 4. In the slave communication device 32, a current consuming circuit (CSM) 33 is connected to a section of the bus connection line 15 between the connection point 15a with the pull-up resistor 18a and the connection terminal 16.

Figure 14:
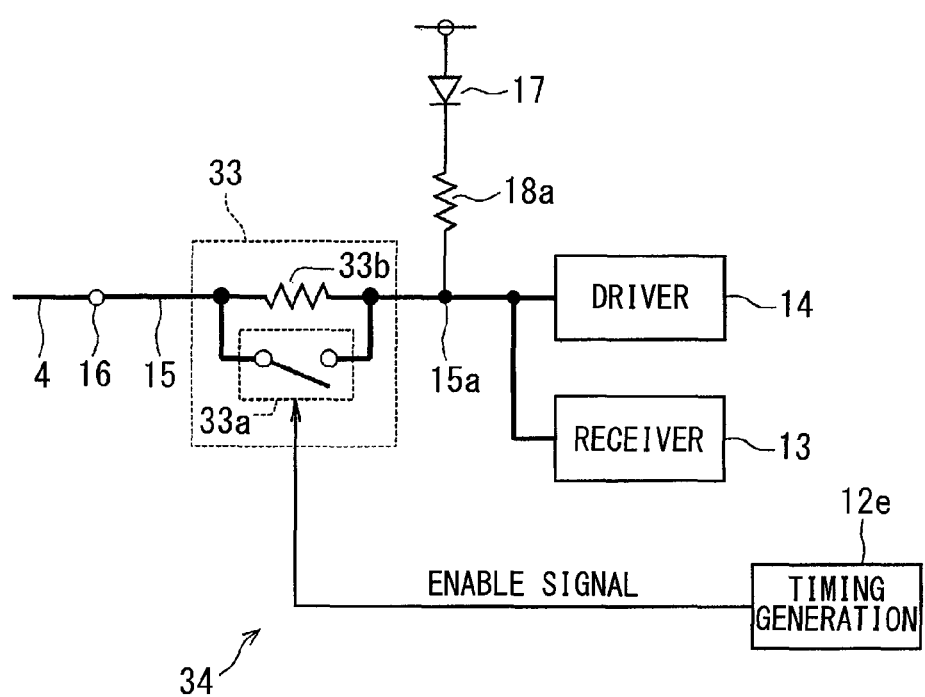
FIG. 14 is a schematic diagram illustrating a current consuming circuit of a slave communication device according to the third embodiment.

As shown in FIG. 14, the current consuming circuit 33 is configured in such a manner that a switch circuit 33a is connected in parallel with a resistor 33b. The switch circuit 33a is in an off state (open state, disconnected state) when the enable signal outputted from the timing generation circuit 12e is on. The switch circuit 33a is in an on state (closed state, connected state) when the enable signal is off. That is, the current consuming circuit 33 has a characteristic of having a higher resistance value when the enable signal is on than when the enable signal is off, so that the current that flowed in the bus connection line 15 from the power supply voltage is consumed. The timing generation circuit 12e and the current consuming circuit 33 constitute a current reduction unit 34.

The structure of the current consuming circuit 33 is not limited to the circuit structure shown in FIG. 14. The current consuming circuit 33 may have any circuit structure as long as the current consuming circuit 33 more consumes the current that flowed in the bus connection line 15 from the power supply voltage when the enable signal is on than when the enable signal is off. For example, the current consuming circuit 33 may have a structure of having a coil or the like.

As described above, in the third embodiment, the slave communication device 32 is provided with the timing generation circuit 12e and the current consuming circuit 33. The operation of the current consuming circuit 33 is switched by the enable signal so that, in the period where the synchronization signal is transmitted and the data signal is not transmitted, the current flowing in the bus connection line 15 from the power supply voltage is consumed in the bus connection line 15.

Therefore, in the period where the synchronization signal is transmitted and the data signal is not transmitted, the current flowing in the bus connection line 15 from the power supply voltage can be consumed in the bus connection line 15. As a result, similarly to the first embodiment, the current flowing into the bus 4 from the slave communication device 3 can be restricted, and the noise superimposed on the signal on the bus 4 can be reduced.

Fourth Embodiment

Figure 15:
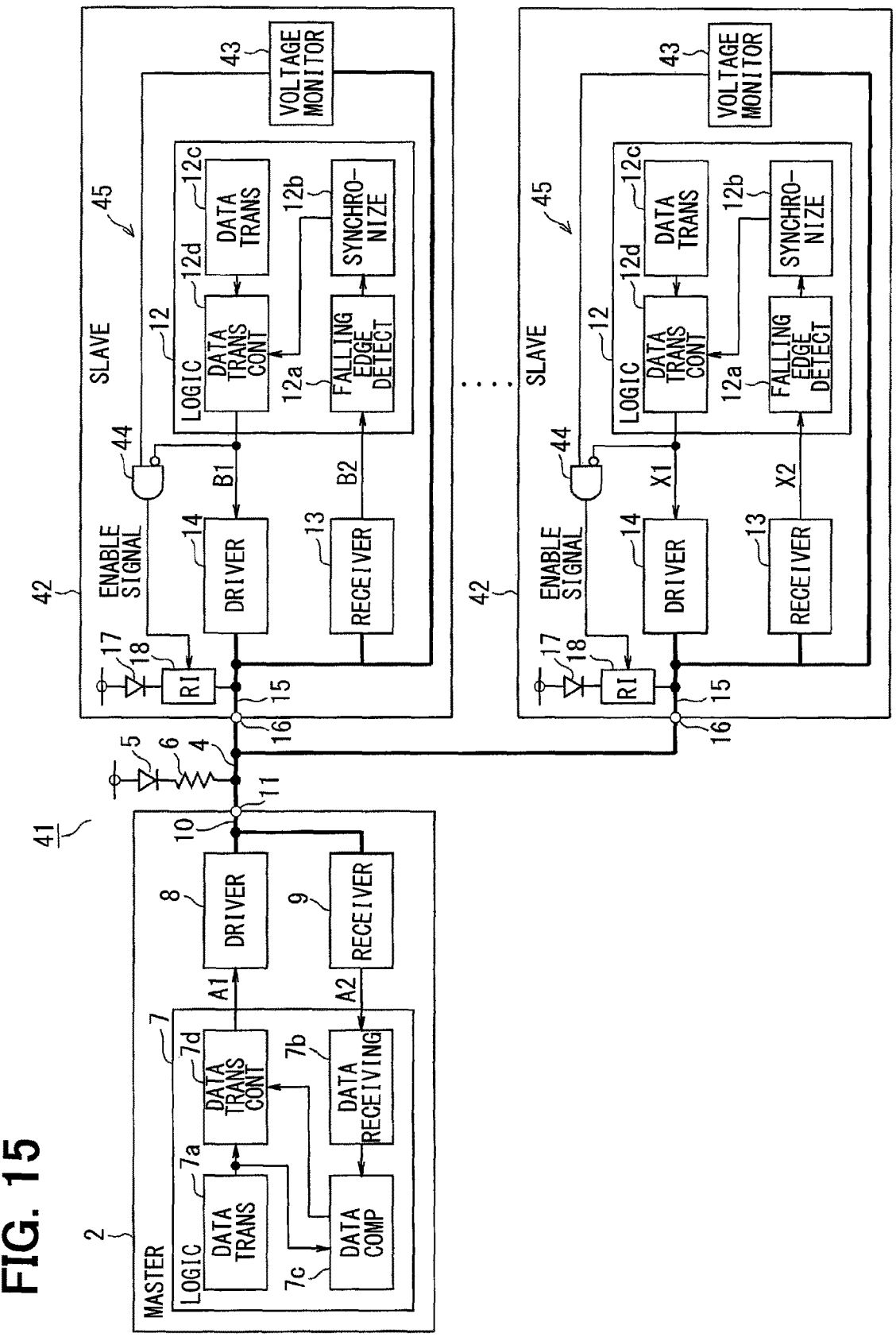
FIG. 15 is a functional block diagram illustrating a bus communication system according to a fourth embodiment of the present disclosure.

A fourth embodiment of the present disclosure will be described with reference to FIG. 15. Hereinafter, descriptions of the parts same as those of the first embodiment will not be repeated, and different parts will be mainly described.

In the fourth embodiment, a bus communication system 41 is configured in such a manner that the master communication device 2 and a plurality of slave communication devices 42 are connected to each other through the single bus 4. The slave communication device 42 has a voltage monitoring circuit 43, in place of the timing generation circuit 12e of the first to third embodiments.

The voltage monitoring circuit 43 monitors (reads out) the voltage of the signal on the bus 4, and compares the voltage monitored with a reference value by a comparator. When the voltage monitored is greater than the reference value, the voltage monitoring circuit 43 provides an on signal to one of input terminals of an AND circuit 44. The data transmission control circuit 12d of the logic circuit 12 provides the transmission data received from the data transmitting circuit 12c to the driver circuit 14, and to the other one of the input terminals of the AND circuit 44.

The AND circuit 44 turns on the enable signal in a period where the voltage of the signal on the bus 4 is greater than the reference value and the transmission data is not outputted from the data transmission control circuit 12d. That is, in the fourth embodiment, the voltage monitoring circuit 43 specifies the period where the synchronization signal is transmitted from the master communication device 2 and the data signal is not transmitted from the slave communication device 3. The voltage monitoring circuit 43, the AND circuit 44 and the resistance increase circuit 18 constitute a current reduction unit 45.

As described above, in the fourth embodiment, the slave communication device 42 is provided with the voltage monitoring circuit 43, the AND circuit 44 and the resistance increase circuit 18. The operation of the resistance increase circuit 18 is changed by the enable signal so that, in the period where the synchronization signal is transmitted and the data signal is not transmitted, the current from the power supply voltage hardly flows into the bus connection line 15.

Therefore, similarly to the first embodiment, in the period where the synchronization signal is transmitted and the data signal is not transmitted, the current flowing into the bus communication line 15 from the power supply voltage can be restricted, and hence the current flowing into the bus 4 from the slave communication device 3 can be restricted.

Fifth Embodiment

Next, a fifth embodiment of the present disclosure will be described with reference to FIG. 16. Hereinafter, descriptions of the parts same as those of the first embodiment will not be repeated, and different parts will be mainly described.

In the fifth embodiment, when the data signal is transmitted from the driver circuit 14 according to the synchronization signal, the slave communication device 3 changes the enable signal from on to off when the predetermined period of time elapses after the enable signal was changed from off to on, similar to the case when the data signal is not transmitted.

In the fifth embodiment, in a period where the transmission of the synchronization signal from the master device 2 and the transmission of the data signal from the slave communication device 3 overlap with each other, the current flowing into the bus connection line 15 from the power supply voltage is restricted, and hence the current flowing into the bus 4 from the slave communication device 3 can be reduced.

That is, in the period where the transmission of the synchronization signal from the master device 2 and the transmission of the data signal from the slave communication device 3 overlap with each other, it is unfixed whether the current flows into the bus 4 from the slave communication device 3. Even in a case where the current flows into the bus 4 from the slave communication device 3, the current flowing into the bus 4 from the slave communication device 3 can be restricted.

Other Embodiments

The present disclosure is not limited to the embodiments described hereinabove, but may be modified or expanded in the following manner.

For example, the structures of the first to third embodiments may be combined in various ways. As an example, the slave communication device may be configured to include both the resistance increase circuit 18 and the current drawing circuit 23. As another example, the slave communication device may be configured to include the resistance increase circuit 18, the current drawing circuit 23 and the current consuming circuit 33.

In the second and third embodiments, the slave communication device may have the voltage monitoring circuit 43 of the fourth embodiment, in place of the timing generation circuit 12e. Also, the switching of the enable signal may be controlled at the timing of the fifth embodiment.

The slave communication device may employ both the timing generation circuit 12e of any one of the first to third embodiments and the voltage monitoring circuit 43 of the fourth embodiment. For example, the logical product or the logical sum of the output of the timing generation circuit 12e and the output of the voltage monitoring circuit 43 may be used as the enable signal.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A slave communication device to be connected to a master communication device through a single bus and to transmit a data signal according to a synchronization signal that is intermittently transmitted from the master communication device at a predetermined transmission interval, the slave communication device comprising:
   a receiver circuit that receives the synchronization signal transmitted from the master communication device;
   a synchronization circuit that generates a synchronization timing based on the synchronization signal;
   a driver circuit that begins to transmit the data signal, in a period where the synchronization signal is transmitted, by superimposing the data signal on the synchronization signal;
   a bus connection line that connects the driver circuit and the receiver circuit to the bus;
   a pull-up resistor through which the bus connection line is coupled to a power supply voltage; and
   a current reduction unit that reduces a current flowing into the bus from the slave communication device by reducing a current flowing into the bus from the bus connection line in the period where the synchronization signal is transmitted from the master communication device.

2. The slave communication device according to claim 1, wherein
   the current reduction unit reduces the current flowing into the bus from the slave communication device in a period where the synchronization signal is transmitted from the master communication device and the data signal is not transmitted from the slave communication device.

3. The slave communication device according to claim 1, wherein
   the current reduction unit includes a resistance increase circuit, and
   the resistance increase circuit increases a resistance value between the power supply voltage and the bus connection line to reduce a current flowing into the bus connection line from the power supply voltage, thereby to reduce the current flowing into the bus from the bus connection line.

4. The slave communication device according to claim 1, wherein
   the current reduction unit includes a current drawing circuit, and
   the current drawing circuit introduces a current flowing in the bus connection line from the power supply voltage to a ground, thereby to reduce the current flowing into the bus from the bus connection line.

5. The slave communication device according to claim 4, wherein
   the current drawing circuit includes a constant current circuit.

6. The slave communication device according to claim 1, wherein
   the current reduction unit includes a current consuming circuit, and
   the current consuming circuit consumes a current flowing in the bus connection line from the power supply voltage in the bus connection line, thereby to reduce the current flowing into the bus from the bus connection line.

7. The slave communication device according to claim 2, wherein
   the current reduction unit specifies the period where the synchronization signal is transmitted from the master communication device based on the synchronization timing.

8. The slave communication device according to claim 2, further comprising:
   a voltage monitoring circuit that monitors a voltage of a signal on the bus, wherein
   the current reduction unit specifies the period where the synchronization signal is transmitted from the master communication device based on the voltage of the signal on the bus monitored by the voltage monitoring circuit.

9. The slave communication device according to claim 1, wherein
   the current reduction unit includes a current reduction circuit and a timing generation circuit,
   the timing generation circuit generates, based on the synchronization timing, an enable signal to activate the current reduction circuit to reduce the current flowing into the bus from the bus connection line in a period where the synchronization signal is transmitted from the master communication device and the data signal is not transmitted from the slave communication device.

10. A bus communication system comprising:
    a master communication device transmitting a synchronization signal; and
    a slave communication device connected to the master communication device through a single bus, wherein
    the master communication device intermittently transmits the synchronization signal at a predetermined transmission interval,
    the slave communication device further includes:
      a receiver circuit that receives the synchronization signal;
      a synchronization circuit that generates a synchronization timing based on the synchronization signal;
      a driver circuit that transmits the data signal, in a period where the synchronization signal is transmitted from the master communication device, by superimposing on the synchronization signal;
      a bus connection line that connects the driver circuit and the receiver circuit to the bus;
      a pull-up resistor through which the bus connection line is coupled to a power supply voltage, and
      a current reduction unit that reduces a current flowing into the bus from the slave communication device by reducing a current flowing into the bus from the bus connection line in the period where the synchronization signal is transmitted from the master communication device.

11. The bus communication system according to claim 10, wherein
    the current reduction unit includes a current reduction circuit and a timing generation circuit, and
    the timing generation circuit generates, based on the synchronization timing, an enable signal to activate the current reduction circuit to reduce the current flowing into the bus from the bus connection line in a period where the synchronization signal is transmitted from the master communication device and the data signal is not transmitted from the slave communication device.

12. The slave communication device according to claim 9, wherein the current reduction circuit is a resistance increase circuit that increases a resistance value between the power supply voltage and the bus connection line to reduce a current flowing into the bus connection line from the power supply voltage, thereby to reduce the current flowing into the bus from the bus connection line.

13. The slave communication device according to claim 9, wherein the current reduction circuit is a current drawing circuit that introduces a current flowing in the bus connection line from the power supply voltage to a ground, thereby to reduce the current flowing into the bus from the bus connection line.

14. The slave communication device according to claim 9, wherein the current reduction circuit is a current consuming circuit that consumes a current flowing in the bus connection line from the power supply voltage in the bus connection line, thereby to reduce the current flowing into the bus from the bus connection line.

15. A slave communication device to be connected to a master communication device through a single bus and to transmit a data signal by superimposing on a synchronization signal that is intermittently transmitted from the master communication device at a predetermined transmission interval, the slave communication device comprising:
- a receiver circuit that receives the synchronization signal transmitted from the master communication device;
- a synchronization circuit that generates a synchronization timing based on the synchronization signal;
- a driver circuit that begins to transmit the data signal based on the synchronization timing, in a period where the synchronization signal is being transmitted, by superimposing the data signal on the synchronization signal; and
- a current reduction unit that reduces a current flowing into the bus from the slave communication device, the current reduction unit being activated in the period where the synchronization signal is being transmitted from the master communication device.

* * * * *